(No Model.)

W. C. McLIMANS.
NUT LOCK.

No. 421,960. Patented Feb. 25, 1890.

Witnesses
Geo. Graf
H. S. Rauch

Inventor
William C. McLimans
By his Attorney
Dan'l H. Herr.

UNITED STATES PATENT OFFICE.

WILLIAM C. McLIMANS, OF GAP, PENNSYLVANIA, ASSIGNOR OF ONE-HALF TO JACOB R. RUTTER, OF SAME PLACE.

NUT-LOCK.

SPECIFICATION forming part of Letters Patent No. 421,960, dated February 25, 1890.

Application filed July 26, 1889. Serial No. 318,770. (No model.)

*To all whom it may concern:*

Be it known that I, WILLIAM C. McLIMANS, of Gap, in the county of Lancaster and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to improvements in nut-locks, in which a spring-washer is combined with a locking device, both being made of one continuous piece of steel spring-wire or other suitable metal, and may be applied to two separate bolts and nuts at the same time, holding each securely in place; and the objects of my invention are to provide an effective elastic washer upon which a nut may be screwed home, and providing said washer with a flexible arm or V having an eye at its apex, embracing through this eye a bicolumned standard or post removed some distance from the bolt and nut in question, and the extreme end of said V adapted to impinge against a side and to receive an angle of the nut, holding it securely in place and firmly locking it against the washer after said nut shall have been screwed home, yet allowing said nut to be readily removed by depressing the locking extremity of said V-shaped arm underneath the nut, when said nut may be readily loosened and removed from its bolt.

My invention is fully illustrated in the accompanying drawings, similar letters and figures referring to similar parts throughout the several views, in which—

Figure 1:
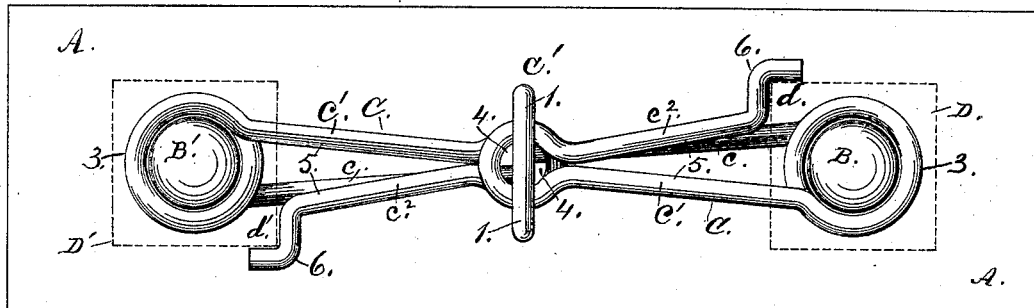
Figure 2:
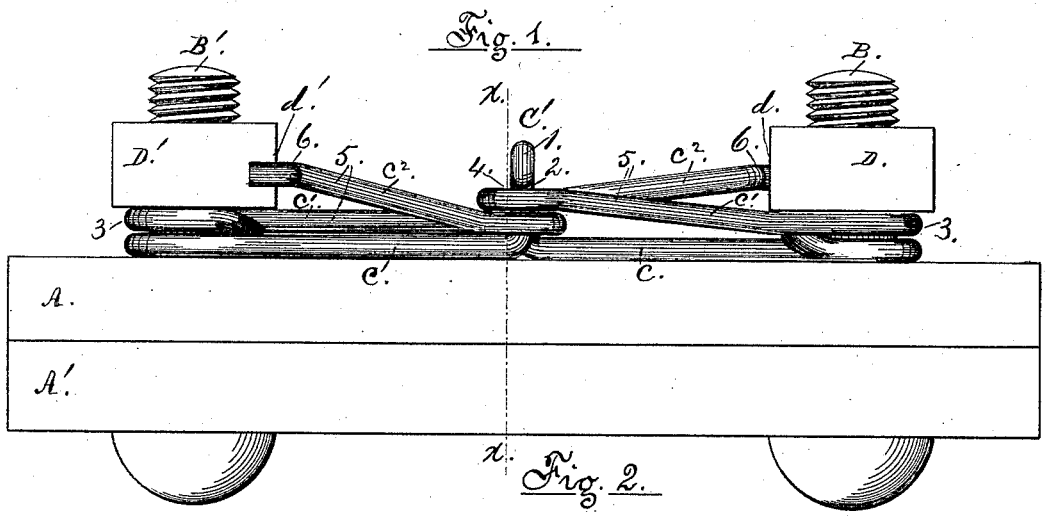
Figures 3, 4, 5:
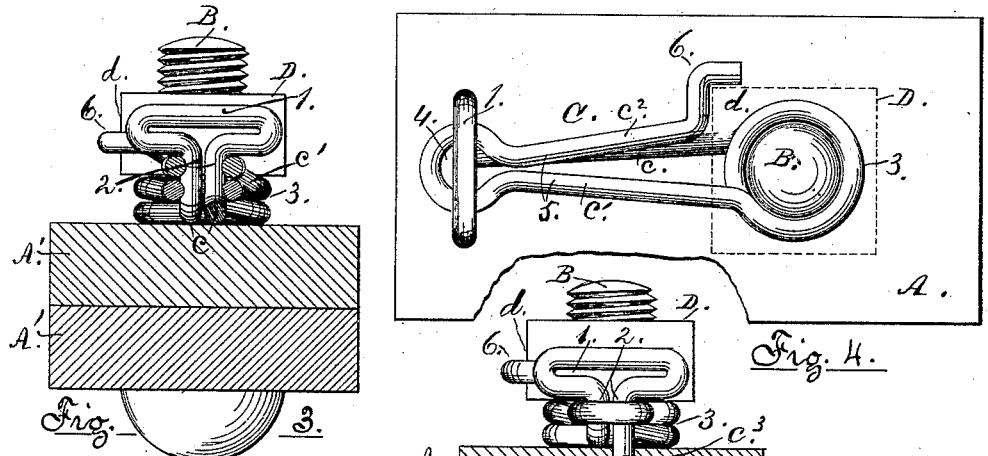

Figure 1 is a plan view of my device applied to two bolts, their nuts being represented in dotted lines; Fig. 2, a side elevation of Fig. 1; Fig. 3, a vertical cross-section through the line $x\,x$ in Fig. 2. Fig. 4 is a plan view of my device applied to a single bolt, its nut appearing in dotted lines; and Fig. 5, an end elevation of Fig. 4, the block or body upon which the washer rests appearing in cross-section through the standard-recess.

In Figs. 1, 2, and 3, A and A' are two bodies held together by bolts B and B', to which is applied, resting on A, my device C. D and D' are two nuts screwed home on said bolts and bearing on the elastic washers of my device C, and are held securely in place by the extremities of two flexible V-shaped arms, each of said extremities adapted to impinge against a side and receive an angle, respectively, of the nuts D and D'.

Beginning at C', I form a compressed loop 1. Passing downward, I form a bicolumned standard or post 2, of a length sufficient to extend through the eyes of two V-shaped or flexible arms; thence outward by shafts $c$ and $c$ to the bolts B and B', and around each two or more times in the direction in which the screws tighten are formed spiral spring or elastic washers 3 and 3; thence back by shafts $c'$ and $c'$ to opposite sides of the bicolumned standard 2, and once around said standard in the same direction are formed eyes 4 and 4; thence by shafts $c^2$ and $c^2$ to a side of the nuts D and D', respectively, will be completed flexible or V-shaped arms 5 and 5, having for sides the shafts $c'$ and $c^2$, and an eye 4, embracing the standard or post 2 in the apex of each, terminating the extremities of the arms 5 and 5 by angular ends 6 and 6, adapted to embrace angles $d$ and $d'$, respectively, of the nuts D and D', when my nut-lock, as applied to two bolts and their nuts, is completed. Its operation may be readily seen from an inspection of Figs. 1, 2, and 3.

Taking one-half of my device C, as described, adapting the length of the bicolumned post 2 to hold through the eye 4 in the apex, one flexible arm 5, as above described, and extending the other column of said post 2 to form a pin $c^3$, adapted to enter a corresponding recess $a$, placed in the body A, my device C is adapted to be applied to a single bolt, holding its nut after having been screwed home securely in place. (See Figs. 4 and 5, where its operation also may be readily seen.)

The compressed loop 1 and the bicolumned standard or post 2 serve to hold together and keep in place the V-shaped arms 5 and 5 by means of the eye 4 in the apex of each, strengthening and stiffening them, making

C' the bracing-point of my invention, and my device C a very effective nut-lock.

I have thus far shown my device as having been made of rounded metal. I do not, however, confine myself to the circular form alone. The metal may be square or rectangular, or it may have any other shape in cross-section. I regard this as an improvement on my invention secured by Letters Patent No. 354,837, dated December 21, 1886.

Having thus described my invention and set forth its application, what I do claim as new, and desire to secure by Letters Patent of the United States, is—

In a nut-lock, the device C as applied to two bolts, made of one piece of metal and possessing the following distinct functional elements, viz: the compressed loop 1, as described, continued into the bicolumned standard or post 2, as and for the purpose described; continued into the outwardly-extending shafts $c$ and $c$ to the bolts B and B' and around said bolts in the direction in which the screws tighten into two or more coils, forming the elastic washers 3 and 3, as described; continued into the inwardly-extending shafts $c'$ and $c'$, as described, to opposite sides of the post 2, and in the same direction around said post 2, forming the eyes 4 and 4, as and for the purpose described; continued into the outwardly-extending shafts $c^2$ and $c^2$ to the sides of the nuts D and D' and terminating in the angular ends 6 and 6, each adapted to impinge against a side and receive an angle $d$ or $d'$ of the nuts D and D', said shafts $c'$ and $c^2$ having at their junction the eye 4, together with the eye 4, forming the flexible or V-shaped arm 5, as described, all substantially as set forth and shown.

In testimony whereof I have hereunto subscribed my name in the presence of two subscribing witnesses.

WILLIAM C. McLIMANS.

Witnesses:
ROBERT CLARK,
EDWIN R. FISHER.